US006295039B1

(12) United States Patent
Mertz et al.

(10) Patent No.: US 6,295,039 B1
(45) **Date of Patent: *Sep. 25, 2001**

(54) THIN ILLUMINATOR FOR REFLECTIVE DISPLAYS

(75) Inventors: Pierre H. Mertz, Mountain View; Brian L. Heffner, Los Altos, both of CA (US)

(73) Assignee: Agilent Technologies, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,962

(22) Filed: Aug. 25, 1998

(51) Int. Cl.[7] .............................. G02B 5/10; G03B 21/14; G09G 5/00; G09G 3/00

(52) U.S. Cl. .................................. 345/32; 345/8; 353/20; 359/853

(58) Field of Search .................................. 353/20, 8, 99; 345/32, 82, 7, 8; 359/487–88, 495, 500, 853

(56) References Cited

U.S. PATENT DOCUMENTS 4,088,400 * 5/1978 Assouline et al. .................... 353/20
5,467,205 11/1995 Kuba et al. ............................ 359/40
5,467,206 * 11/1995 Loisenaux et al. .................... 359/40
5,506,705 4/1996 Yamamoto et al. .................. 359/40
5,673,059 * 9/1997 Zavracky et al. ........................ 345/8
5,684,354 11/1997 Gleckman ............................ 313/110
5,757,341 * 5/1998 Calrke et al. .......................... 345/32
5,812,225 * 9/1998 De Lauzun et al. .................. 349/67
5,853,240 * 12/1998 Tanaka et al. ........................ 353/20
5,980,054 * 11/1999 Fukui et al. .......................... 362/21

FOREIGN PATENT DOCUMENTS 06110033 4/1994 (JP) .

* cited by examiner

*Primary Examiner*—Jeffery Brier
*Assistant Examiner*—Anthony J. Blackman

(57) ABSTRACT

A display that includes an array of reflective pixels, a linear light source; and a reflector. The reflector includes a cylindrical surface, the axis of the cylindrical surface being parallel to the linear light source. The linear light source is positioned relative to the reflector such that light from the linear light source is reflected by the reflector onto the array of reflective pixels. The reflector is constructed from a material that is partially reflecting. The linear light source preferably includes a plurality of light emitting diodes and an optical diffuser. In a color display, the light emitting diodes include diodes having different emission spectra. In one embodiment of the invention, the reflector is constructed from a material that reflects light of a first linear polarization while transmitting light having a linear polarization orthogonal to the first linear polarization. In this embodiment, each pixel in the array of reflective pixels preferably includes a polarization rotating cell that rotates the linear polarization vector of light reflected by the pixel in response to the receipt of an electrical signal by the pixel.

6 Claims, 5 Drawing Sheets

THIN ILLUMINATOR FOR REFLECTIVE DISPLAYS

FIELD OF THE INVENTION

The present invention relates to display systems, and more particularly, to the illumination of display systems in which a plurality of pixels generate an image by reflecting light from one or more light sources.

BACKGROUND OF THE INVENTION simplify the following discussion, the present invention will be discussed in terms of displays utilized in head mounted computer displays; however, it will be apparent to those skilled in the art from the following discussion that the present invention may be applied to other types of displays. Head-mounted computer displays may be viewed as "eye glasses" that are worn by the user to view images created by a computer or other video source. The image seen by each eye is generated on a display screen having a two dimensional array of pixels.

In one type of display, each pixel is a small mirror that is covered by a "shutter" that is controlled by the voltage of the mirror. The shutter is constructed from a layer of liquid crystal on the mirrors. The voltage controls the state of the liquid crystal on top of the pixel so as to modulate the reflected light. A light source illuminates the pixels and the modulated reflected light from the pixels is imaged into the eye of the viewer. The imaging optics typically consist of lenses that magnify the pixels and form a virtual image. The light source is typically constructed from 3 LEDs that emit different colors.

For this type of display to function properly, the intensity of light reflected by each micro-mirror must be independent of the pixel's location in the display. In addition, each pixel must appear to be an independent light source. The illumination must be both spatially and angularly uniform, with the angular extent given by the acceptance angle (f-number) of the imaging optics. In prior art systems these constraints are met by converting the three point light sources into a diffuse light beam that strikes the display at right angles to the plane of the mirrors. The light source utilizes a condenser lens to collimate or slightly diverge the light to match the telecentricity of the imaging optic and an array of micro-lenses or a diffuser in the collimated light beam to provide the required diffusion. Since the light source must be outside the field of view of the user so as not to block the image generated by the display, a half silvered mirror is used to illuminate the display while allowing light reflected by the display to reach the eye of the viewer.

This prior art solution to the illumination problem has several problems. First, the distance between the first imaging optic and the display must be at least as great as the shortest dimension of the display to provide room for the half-silvered mirror. Second, the illuminator requires a condenser lens and diffuser which must be at least as large as the display. These constraints lead to a bulky display. Both the size and the weight of this type of display are objectionable.

To collimate the light source, all of the LEDs must be very close to the focal point of the collimating lens and limited in size so as to simulate a single point source and properly mix the colors of the LEDs. This constraint limits the size of the LEDs, and hence, the maximum intensity of light from the display. In addition, the half-silvered mirror decreases the brightness of the display, since only one fourth of the light in the collimated beam actually reaches the viewer's eye.

Broadly, it is the object of the present invention to provide an improved illumination system for a reflective display.

It is a further object of the present invention to provide a display system that does not require the use of a half-silvered mirror to illuminate the pixels.

These and other objects of the present invention will become apparent to those skilled in the art from the following detailed description of the invention and the accompanying drawings.

SUMMARY OF THE INVENTION

The present invention is a display that includes an array of reflective pixels, a linear light source; and a reflector. The reflector includes a cylindrical surface preferably having a parabolic cross-section, the axis of the cylindrical surface being parallel to the linear light source. The linear light source is positioned relative to the reflector such that light from the linear light source is collimated by the reflector onto the array of reflective pixels. The reflector is constructed from a material that is partially reflecting. The linear light source preferably includes a plurality of light emitting diodes and an optical diffuser. In a color display, the light emitting diodes comprise diodes having different emission spectra. In one embodiment of the invention, the reflector is constructed from a material that reflects light of a first linear polarization while transmitting light having a linear polarization orthogonal to the first linear polarization. In this embodiment, each pixel in the array of reflective pixels preferably includes a polarization rotating cell that rotates the linear polarization vector of light reflected by the pixel in response to the receipt of an electrical signal by the pixel.

DETAILED DESCRIPTION ON THE INVENTION

Figure 1:
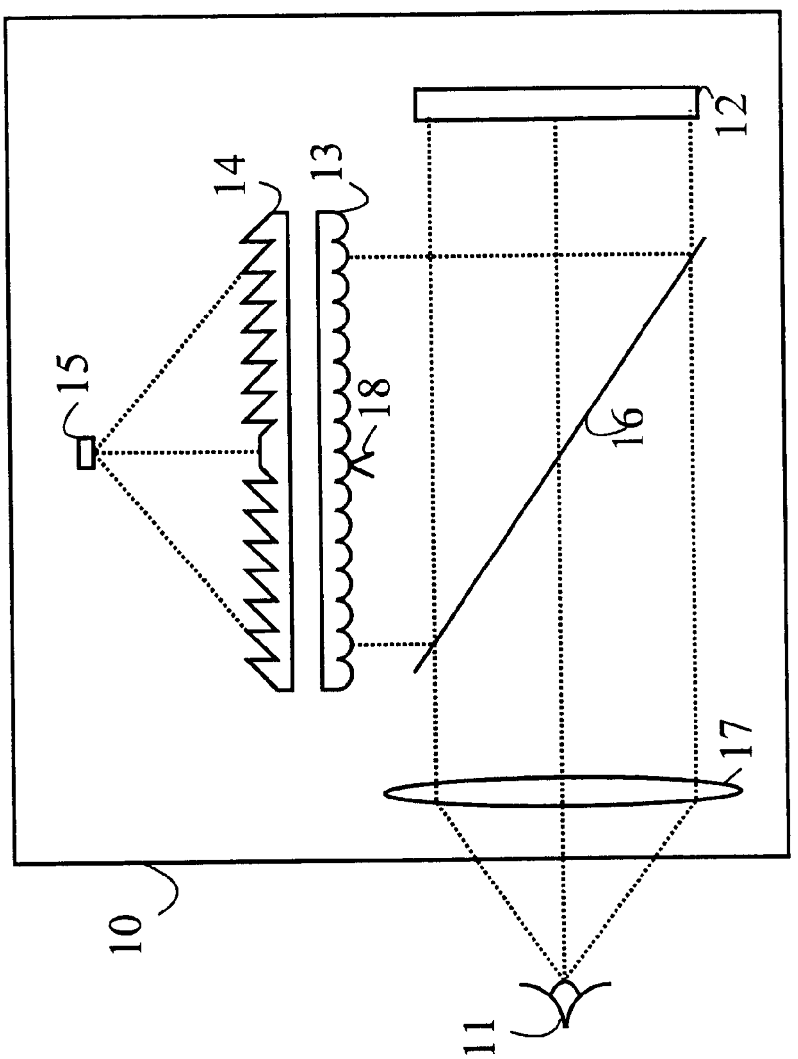
FIGURE 1 (PRIOR ART)
FIG. 1 is a cross-sectional view of a prior art display system.

The present invention may be more easily understood with reference to FIG. 1 which is a cross-sectional view of the prior art display system 10 discussed above. A display screen 12 is illuminated by a light source consisting of a LED 15 close to the focal point of a Fresnel lens 14. Fresnel lens 14 provides either a collimated light source or a slightly diverging light source that matches the telecentricity of the imaging optic. The light leaving Fresnel lens 14 is diffused by a diffuser or micro-lens array 13 as shown at 18. The light from the source is reflected from a half-silvered mirror 16 onto display 12. The light reflected back by display 12 is imaged by lens 17 into the eye 11 of the user. It should be noted that, at most, half of the light leaving diffuser 13 reaches display 12, since mirror 16 allows half of the light to pass through the mirror. Similarly, only half of the light leaving display 12 reaches lens 17 for the same reason. It should also be noted that the minimum values for the width and height of the display system are set by the illumination optics. As noted above, such systems are bulky and have limitations on the maximum light intensity that can be delivered to the eye of the viewer.

Figure 3:
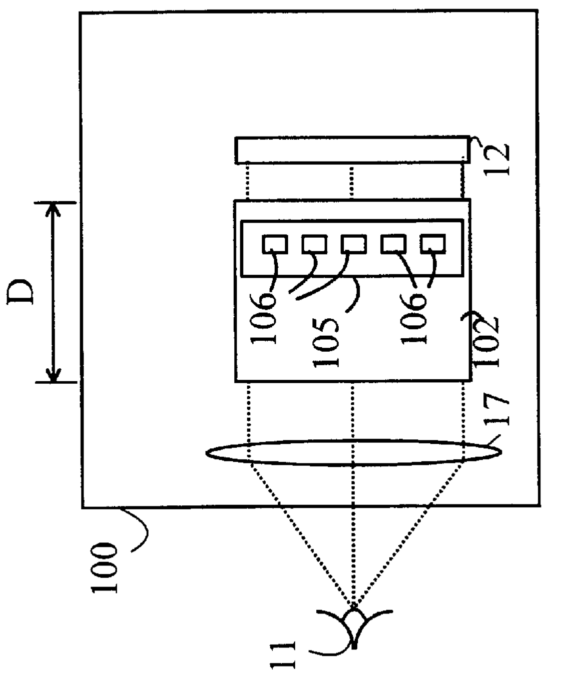
FIG. 3 is a top view of the display shown in FIG. 2.
Figure 2:
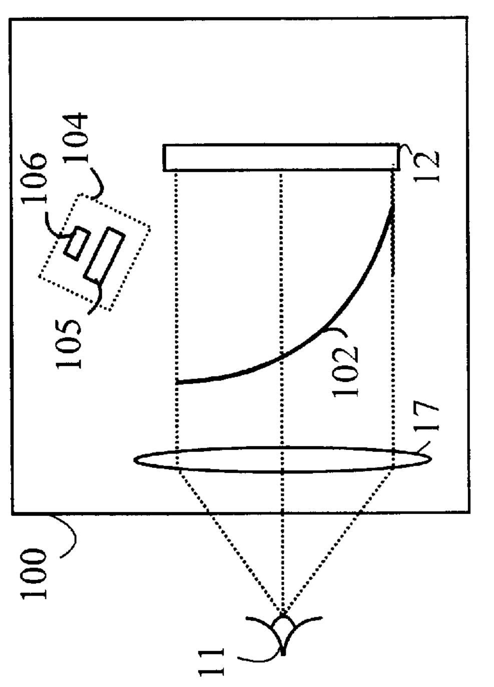
FIG. 2 is a side view of a display system according to the present invention.

Refer now to FIGS. 2 and 3, which are side and top views of a display system 100 according to the present invention. In display system 100, the half-silvered mirror utilized in prior art systems is replaced by cylindrical parabolic reflector 102. FIG. 2 is a side view of display system 100 in a direction parallel to the axis of reflector 102. FIG. 3 is a top view of display system 100. Reflector 102 provides both the functions of the condenser and the partially reflecting mirror. Reflector 102 is illuminated with a diffuse line source 104, which is preferably constructed from a diffuser 105 and a plurality of LEDs 106.

Figure 4:
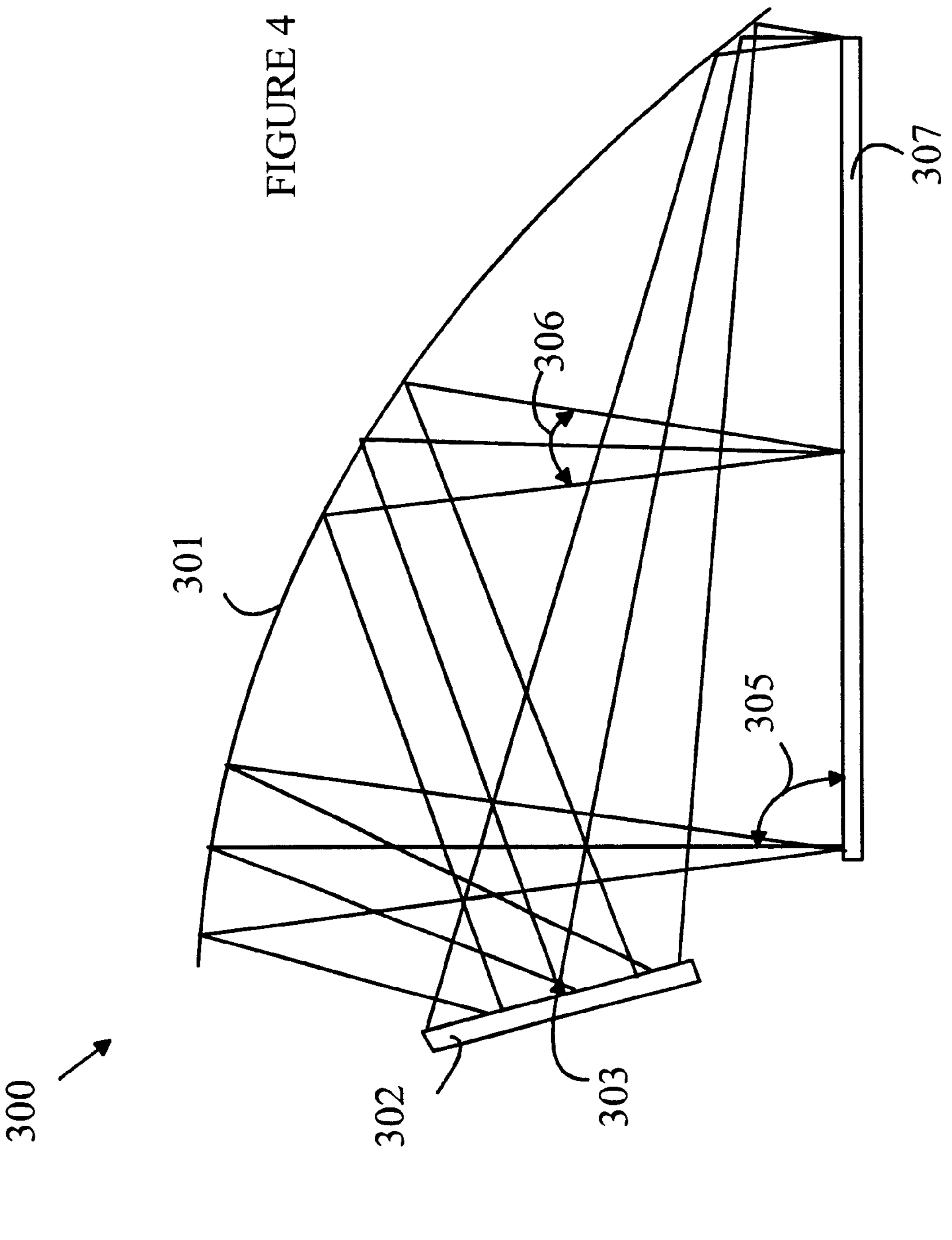
FIG. 4 is a cross-sectional view of a display system according to the present invention.

Refer now to FIG. 4 which is a cross-sectional view of a display system according to the present invention. Display system 300 includes a display 307, a reflector 301, and a diffuse light source 302. To provide the angular spread of the illumination required to fill the acceptance angle of the imaging optics, the light source needs to have vertical spatial extent. In the case of a telecentric system, reflector 301 is parabolic. In non-telecentric systems, reflector 301 is typically a hyperbolic or ellipsoidal surface. The parabolic surface converts this spatially extended source 302 to an angular cone of light having an opening angle 306 and angle 305 with respect to the display surface. In telecentric systems, angle 305 is 90°. The focal point 303 of reflector 301 is in the middle of source 302. The cone angle in the orthogonal direction is provided by the diffuser on the source, in a manner analogous to the micro-lenses discussed with reference to the prior art system shown in FIG. 1. If the imaging optics are not telecentric, the cross-section of the cylindrical surface can be made elliptical or hyperbolic, so that the chief rays match those of the imaging optics. The telecentricity in the other direction can not be matched geometrically, but the diffusion of the source in this direction provides the necessary rays.

It should be noted that the distance, D, required to accommodate reflector 102 is approximately half the distance required for the partially reflecting mirror utilized in the above-described prior art display systems. Hence, the present invention has substantially less bulk and weight than prior art displays. Further, the present invention utilizes a plurality of LEDs. Hence, the present invention provides substantially higher illumination of the display.

In a color display according to the present invention, the light source includes a plurality of LEDs for each color of light. Typically, three different colors are utilized to construct the color image. The color image is constructed by sequentially displaying the red, blue, and green images in a time-span that is shorter than the time interval in which the eye can resolve separate images. The various color LEDs are positioned along the axis of the light source such that the light source is effectively three linear light sources that are superimposed on one another.

Figure 5:
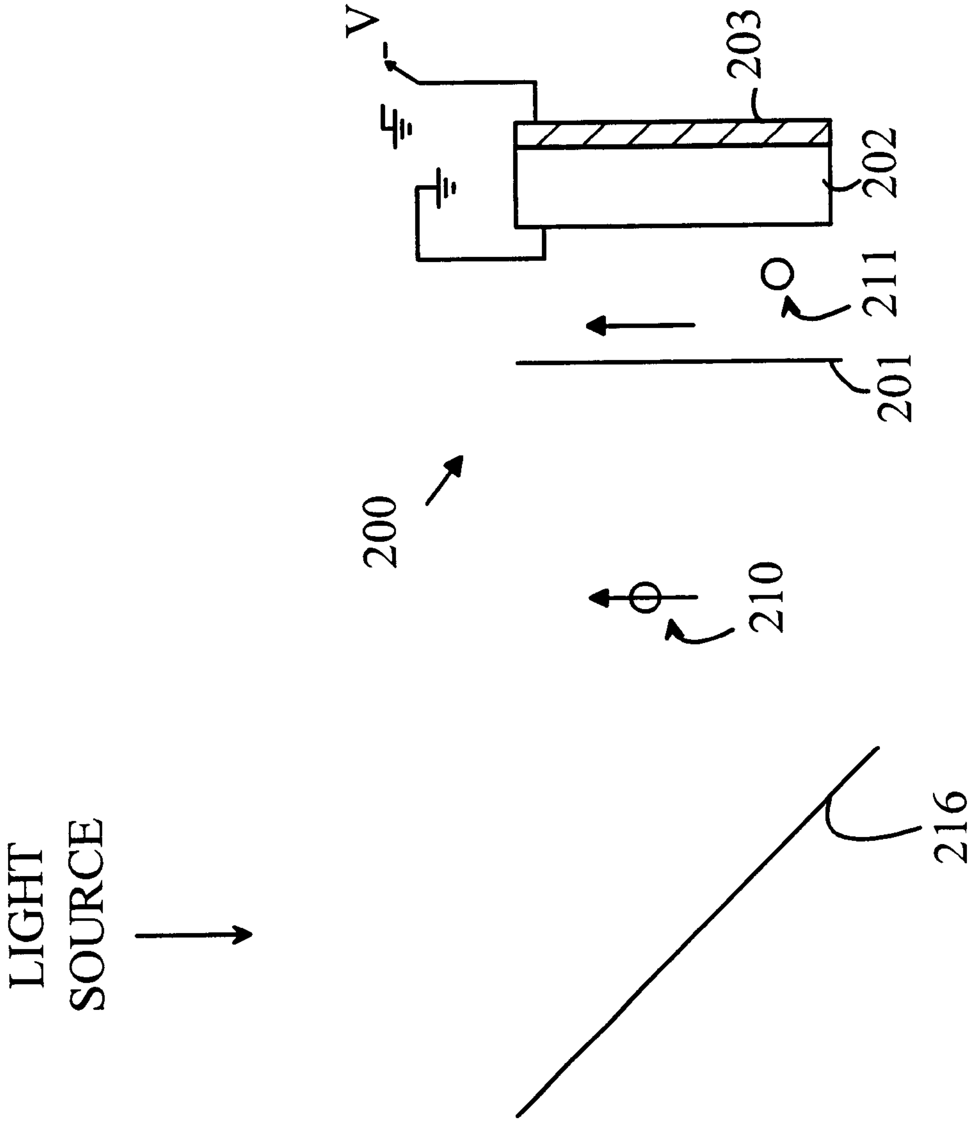
FIG. 5 illustrates the manner in which a typical prior art reflective display operates.

As noted above, one problem with prior art displays results from the use of a partially reflecting mirror, which reduces the effective illumination by 75%. The preferred embodiment of the present invention utilizes a material for the construction of the parabolic reflector that overcomes this problem when utilized with a display that operates by rotating the polarization of the incident light. The manner in which this aspect of the present invention operates may be more easily understood with reference to FIG. 5 which illustrates the manner in which a typical prior art reflective display operates. To simplify the drawing, only one pixel of the display is shown. Pixel 200 consists of a polarization filter 201 which selects one linear polarization component of the incident light which may be viewed as consisting of two equal intensity linearly polarized components as shown at 210. In the case shown in FIG. 5, it is assumed that the vertical component is passed by filter 201. The light passing through filter 201 is reflected by a reflective coating 203 on the back of a liquid crystal element 202. This coating also acts as an electrode for applying a voltage across the liquid crystal element. The light exiting the liquid element will have a polarization that is either vertical or horizontal depending on the potential across the liquid crystal element. If the exiting light has a polarization that has been rotated to the horizontal direction as shown at 211, the light will be blocked by the polarization filter, and hence, the pixel will appear black. If the direction of polarization remains vertical, the light will pass through filter 201, and the pixel will be bright.

The reflected light must still pass back through the half-silvered mirror 216 in prior art displays. Hence, the maximum light intensity relative to the source intensity is $\frac{1}{8}^{th}$, since one half of the light is lost in the first reflection that directs the light onto the display. Another 50% of the light intensity is lost in polarization filter 201. Finally, yet another 50% of the remaining light is lost passing back through half silvered mirror 216.

Figure 6:
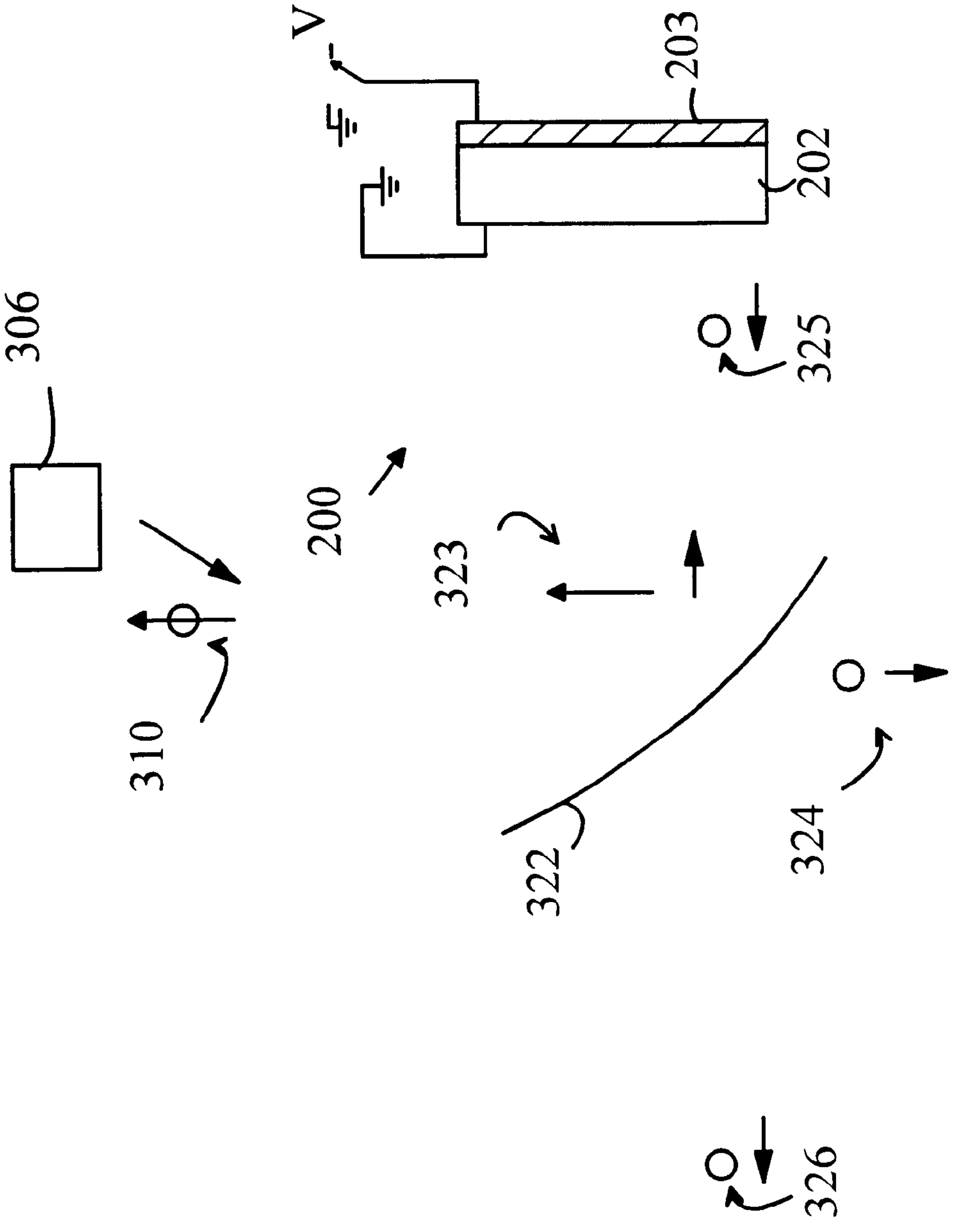
FIG. 6 is an expanded view of a reflective pixel according to the present invention illustrating the manner in which the preferred reflector material improves the efficiency of the display.

The present invention combines the polarization function of filter 201 utilized in prior art displays with the parabolic condenser lens. As a result, the effective light intensity reaching the viewer is one half of the source intensity. The manner in which this is accomplished may be more easily understood with reference to FIG. 6 which is an expanded view of a pixel according to the present invention. Light from source 306 is directed toward parabolic reflector 322. The light is assumed to be unpolarized, and hence, consists of equal intensities of vertical and horizontally polarized light as shown at 310. Reflector 322 is constructed from a material that reflects light of one polarization while transmitting light of the orthogonal polarization. Such materials are known to the art. For example 3M markets such a material under the trade name DUAL BRIGHTNESS ENHANCEMENT FILM (DBEF). For the purposes of this discussion, it will be assumed that reflector 322 has been constructed such that vertically polarized light is reflected and horizontally polarized light is reflected. Hence, the light from source 306 that is vertically polarized is reflected toward the pixel as shown at 323 while the horizontally polarized component passes through reflector 322 as shown at 324.

The vertically polarized light goes on to strike the reflective surface 203 of the pixel after passing through the liquid crystal element 202. If the potential across the liquid crystal element is set such that the direction of polarization is rotated through 90degrees as shown at 325, the reflected light will pass through reflector 322 and reach the eye of the viewer. In this case, the pixel will appear bright. If, however, the voltage across the liquid crystal element is such that the direction of polarization is not rotated, the light reflected by the pixel will also be reflected by reflector 322 back toward the light source 306. In this case, the pixel will appear dark.

It should be noted that the light passing through the reflector upon reflection by the pixel does not suffer any attenuation. That is, the reflector appears transparent to that light. Accordingly, the only light loss due to reflector 322 is the initial 50 percent loss associated with the separation of the unpolarized light from source 306 into vertical and horizontal components, i.e., the loss of the light shown at

324. Hence, the present invention has 4 times the efficiency of prior art displays.

Various modifications to the present invention will become apparent to those skilled in the art from the foregoing description and accompanying drawings. Accordingly, the present invention is to be limited solely by the scope of the following claims.

What is claimed is:

1. A display comprising:

an array of reflective pixels;

a linear light source comprising a line source that emits light in a pattern defined by an axis; and a reflector comprising a cylindrical surface, the axis of said cylindrical surface being parallel to said axis of said light source, said linear light soucer being position relative to said reflector such that light from said linear light soucer is reflected by said reflector into said array of reflective pixels, said reflector comprising a material that is partially reflecting.

2. The display of claim 1, wherein said linear light source comprises a plurality of light emitting diodes and an optical diffuser.

3. The display of claim 2 wherein said light emitting diodes comprise diodes having different emission spectra.

4. The display of claim 1 wherein said reflector comprises a material that preferentially reflects light of a first linear polarization while preferentially transmitting light having a linear polarization orthogonal to said first linear polarization.

5. The display of claim 4 wherein each pixel in said array of reflective pixels comprises a polarization rotating cell that rotates the linear polarization vector of light reflected by said pixel in response to the receipt of an electrical signal by said pixel.

6. An illumination system for illuminating a reflective display, said illumination system comprising:

a linear light source comprising a line source that emits light in a pattern defined by an axis; and a reflector comprising a cylindrical surface, the axis of said cylindrical surface being parallel to said axis of said linear light source, said linear light source being positioned relative to said reflector such that light from said linear light source is reflected by said reflector onto said reflective display, said reflector comprising a material that preferentially reflects light of a first linear polarization while preferentially transmitting light having a linear polarization orthogonal to said first linear polarization.

* * * * *